US012454350B2

(12) United States Patent
Viswanathan et al.

(10) Patent No.: US 12,454,350 B2
(45) Date of Patent: Oct. 28, 2025

(54) TAPERED TORQUE PLATE BARREL FOR IMPROVING DYNAMIC STABILITY

(71) Applicant: Goodrich Corporation, Charlotte, NC (US)

(72) Inventors: Sundar Viswanathan, Dayton, OH (US); Phillip E. Cooley, Kettering, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 408 days.

(21) Appl. No.: 17/885,381

(22) Filed: Aug. 10, 2022

(65) Prior Publication Data

US 2024/0051660 A1 Feb. 15, 2024

(51) Int. Cl.
*B64C 25/44* (2006.01)
*F16D 55/00* (2006.01)
*F16D 55/36* (2006.01)
*F16D 65/02* (2006.01)

(52) U.S. Cl.
CPC .............. *B64C 25/44* (2013.01); *F16D 55/36* (2013.01); *F16D 2055/0058* (2013.01)

(58) Field of Classification Search
CPC . B64C 25/44; F16D 55/36; F16D 2055/0008; F16D 2065/134; F16D 2065/1388; F16D 65/0006; F16D 55/40; F16D 55/44; F16D 65/0056
See application file for complete search history.

(56) References Cited

U.S. PATENT DOCUMENTS

| 4,585,096 A * | 4/1986 | Bok | F16D 55/40 |
| | | | 188/73.37 |
| 5,024,297 A * | 6/1991 | Russell | F16D 65/84 |
| | | | 188/264 G |
| 5,156,239 A * | 10/1992 | Ericson | B66B 1/3476 |
| | | | 187/393 |
| 5,323,881 A * | 6/1994 | Machan | F16D 55/36 |
| | | | 188/18 A |
| 6,230,852 B1* | 5/2001 | Trustee | F16D 55/36 |
| | | | 188/73.35 |
| 6,550,588 B2 * | 4/2003 | Hinton | B60B 27/00 |
| | | | 188/106 A |
| 6,631,793 B2 * | 10/2003 | Evrard | F16D 65/095 |
| | | | 188/71.6 |

(Continued)

FOREIGN PATENT DOCUMENTS

EP 0398274 11/1990
EP 0480358 4/1992

OTHER PUBLICATIONS

European Patent Office, European Search Report dated Oct. 24, 2023 in Application No. 23190325.3.

(Continued)

*Primary Examiner* — Robert A. Siconolfi
*Assistant Examiner* — James K Hsiao
(74) *Attorney, Agent, or Firm* — SNELL & WILMER L.L.P.

(57) ABSTRACT

A torque plate barrel for use with a brake system is disclosed herein. The torque plate barrel includes a barrel body having an outer diameter, an inner diameter, and an axial length extending from a first end to an opposing second end, wherein the inner diameter varies along the axial length and the outer diameter is fixed along the axial length.

13 Claims, 6 Drawing Sheets

(56) References Cited

U.S. PATENT DOCUMENTS

| | | | | |
|---|---|---|---|---|
| 6,752,248 B2* | 6/2004 | Berwanger | ............ | F16D 55/36 188/73.31 |
| 8,523,108 B2* | 9/2013 | Coty | ............ | F16D 55/40 188/71.6 |
| 8,616,344 B2* | 12/2013 | Baden | ............ | F16D 55/40 188/71.5 |
| 8,950,557 B2* | 2/2015 | Houser | ............ | F16D 55/36 192/70.2 |
| 9,193,448 B2* | 11/2015 | Crescenzo | ............ | B64C 25/36 |
| 9,638,273 B2* | 5/2017 | Schmidt | ............ | B60T 1/10 |
| 9,670,975 B1* | 6/2017 | Rook | ............ | F16D 65/0006 |
| 9,759,278 B2* | 9/2017 | Rook | ............ | F16D 55/36 |
| 9,926,991 B2* | 3/2018 | Riebe | ............ | F16D 55/24 |
| 10,473,171 B2 | 11/2019 | Cooley | | |
| 10,494,087 B2 | 12/2019 | Cooley | | |
| 10,677,300 B2* | 6/2020 | Steele | ............ | B33Y 80/00 |
| 2005/0194220 A1* | 9/2005 | Edmisten | ............ | F16D 55/40 188/71.5 |
| 2007/0284478 A1* | 12/2007 | Soderberg | ............ | B64C 25/36 244/103 R |
| 2010/0140027 A1* | 6/2010 | Baden | ............ | F16D 55/36 188/71.5 |
| 2012/0325594 A1* | 12/2012 | Rook | ............ | F16D 55/36 29/592 |
| 2013/0199878 A1* | 8/2013 | Houser | ............ | F16D 55/36 188/73.39 |
| 2014/0356058 A1* | 12/2014 | Lee | ............ | E02D 5/34 403/301 |
| 2017/0175832 A1* | 6/2017 | Rook | ............ | F16D 55/36 |
| 2018/0128331 A1* | 5/2018 | Stevenson | ............ | F16D 65/0978 |
| 2019/0047686 A1* | 2/2019 | Cooley | ............ | F16D 65/0006 |
| 2021/0262526 A1 | 8/2021 | Fish | | |
| 2023/0294822 A1* | 9/2023 | Schmidt | ............ | F16D 65/18 188/158 |

OTHER PUBLICATIONS

European Patent Office, European Office Action dated Feb. 25, 2025 in Application No. 23190325.3.

\* cited by examiner

TAPERED TORQUE PLATE BARREL FOR IMPROVING DYNAMIC STABILITY

FIELD

The present disclosure generally relates to aircraft wheel and brake systems and, more specifically, to torque plates and barrels of brake assemblies.

BACKGROUND

Aircraft typically utilize brake systems on wheels to slow or stop the aircraft during landings, taxiing, and rejected takeoffs. The brake systems generally employ a brake stack comprising a series of friction disks that may be forced into sliding contact with one another during brake actuation to slow or stop the aircraft. A torque plate is employed to support the series of friction disks. The sliding frictional contact between discs during brake actuation induces vibration which can result in damage to the brake equipment.

SUMMARY

A torque plate barrel for use with a brake system is disclosed herein. The torque plate barrel includes a barrel body having an outer diameter, an inner diameter, and an axial length extending from a first end to an opposing second end, wherein the inner diameter varies along the axial length and the outer diameter is fixed along the axial length. In various embodiments, the barrel body has a first thickness at the first end and a second thickness at the second end. In various embodiments, the first thickness is less than the second thickness. In various embodiments, the first thickness is about 20% to about 70% of the second thickness.

In various embodiments, the varying inner diameter forms a taper that extends axially along the inner surface of the barrel body. In various embodiments, a first distance is defined as being between a first point on the inner surface at the first thickness and an opposing second point on the inner surface at the first thickness, and a second distance is defined as being between a third point on the inner surface at the second thickness and an opposing fourth point on the inner surface at the second thickness. In various embodiments, the second distance is less than the first distance. In various embodiments, the second distance is about 1% to about 10% less than the first distance. In various embodiments, the second distance is about 3% to about 7% less than the first distance. In various embodiments, the torque plate barrel further includes a back leg disposed at the second end of the barrel body.

Also disclosed herein is a brake assembly attached to a wheel. The brake assembly includes a torque barrel having an inner diameter and an axial length, the axial length having a first end and an opposing second end, the inner diameter decreasing along the axial length from the first end to the second end, wherein the torque plate barrel has a first thickness at the first end and a second thickness at the second end. The brake assembly further includes a heat sink disposed around the torque plate barrel and a plurality of stator disks mounted to the torque plate barrel.

In various embodiments, the decreasing inner diameter forms a taper that extends axially along an inner surface of the torque barrel. In various embodiments, the first thickness is about 20% to about 70% of the second thickness. In various embodiments, the torque barrel further includes a barrel body and a back leg connected to the barrel body adjacent the second end. In various embodiments, the torque barrel further includes an outer surface extending along the axial length, wherein the outer surface is uniform along the axial length.

In various embodiments, the first thickness is less than the second thickness. In various embodiments, the torque plate barrel has a first inner diameter at the first end that is greater than a second inner diameter at the second end. In various embodiments, the second diameter is about 1% to about 10% less than the first diameter.

Also disclosed herein is a method of forming a torque plate barrel. The method includes receiving a torque plate barrel having a first end and an opposing second end, the torque plate barrel having an inner surface sidewall extending from the first end to the second end, and performing a tapering process to remove material from the inner surface sidewall, the tapering process removing more material from the inner surface sidewall at the first end torque plate barrel than from the second end of the torque plate barrel.

In various embodiments, the method further includes performing a second tapering process, the second tapering process creating a uniform change in thickness from the first end to the second end. In various embodiments, the method further includes connecting a back leg to the second end of the torque plate barrel.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Described herein, in accordance with various embodiments, is a torque plate barrel including a torque plate barrel body having a tapered inner surface. In various embodiments, the taper of the torque plate barrel body improves the dynamic stability (e.g., reduced vibration) of the torque plate barrel with little to no increase to the weight of the torque plate barrel as compared to conventional designs. The dynamic stability is improved in both a squeal mode and a whirl mode. The squeal mode is characterized by a torsional vibration of nonrotating brake parts around the axle of a brake system. The whirl mode is characterized by a lateral displacement and rotation of a heat sink stack in two perpendicular planes, including a cantilevered end of the torque plate barrel orbiting around the axle and out-of-plane axial motion of pistons with a phase difference.

In various embodiments, whirl mode can be considered a design driver mode and it may be desired to reduce whirl mode vibrations. The complex rotating-bending of the brake and axle occurring during whirl model may result in an out-of-plane rotation for discs called accordion motion. This accordion motion leads to non-uniform pressure distribution on the wear face which may result in increased dynamic instability, increased wear rate, and damage to components. The system instability occurring during whirl mode can be reduced by altering the friction coefficient at a wear face, a clamp force and through various geometry, and brake design parameters, among others.

As described herein, in accordance with various embodiments, a torque plate barrel having a tapered inner surface may improve dynamic stability and mitigate brake induced vibration. Altering the stiffness of the torque plate barrel through design changes affects the critical mode behavior and energy dissipation. In various embodiments, the torque plate barrel described herein provides an efficient way to improve the dynamic stability of the brake system with little to no increase in weight and cost while not complicating the manufacturing of the torque plate barrel.

Figure 1A:
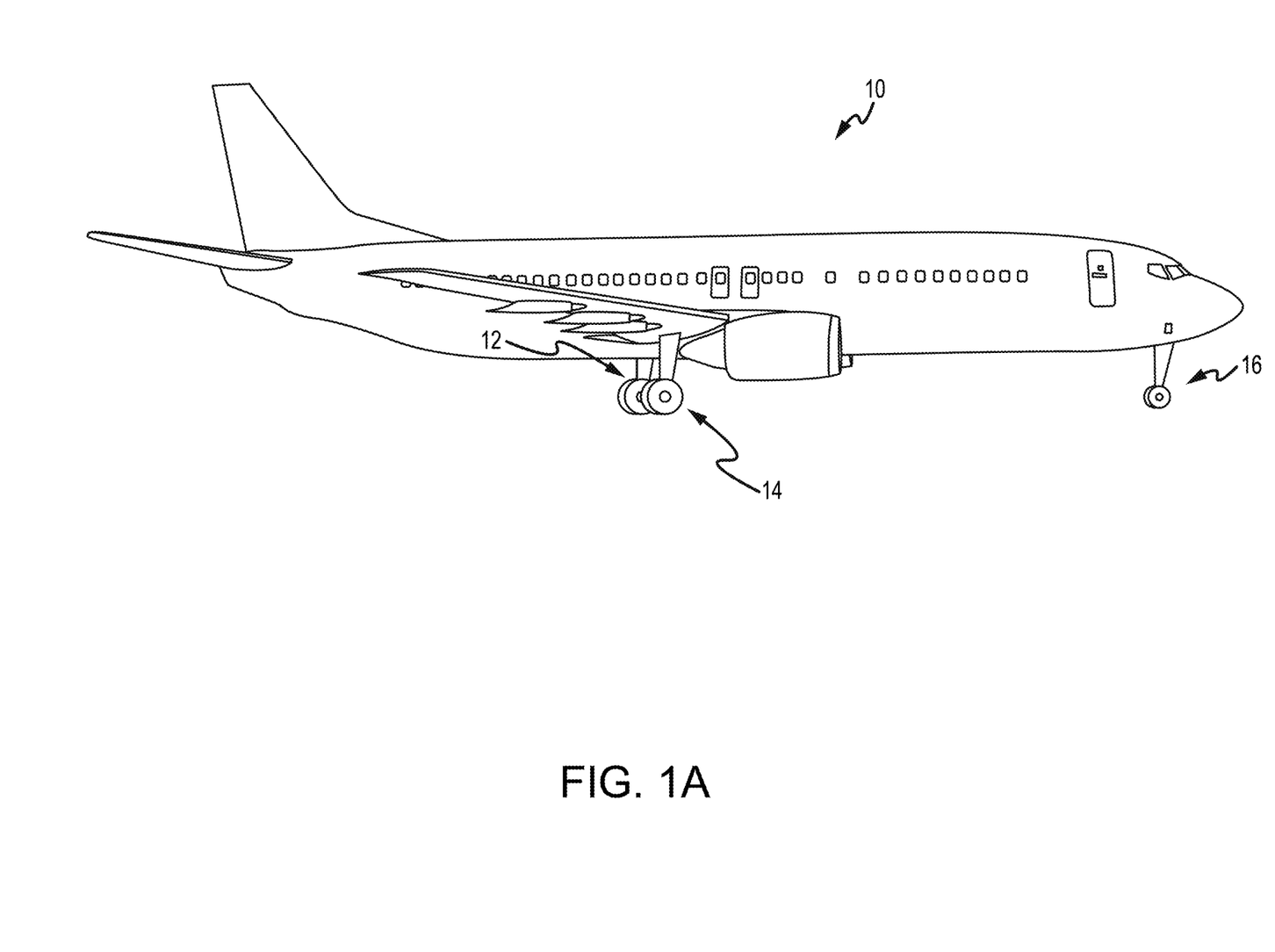
FIG. 1A illustrates an aircraft having a brake system, in accordance with various embodiments.

Referring to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just referred, the disclosure nevertheless contemplates any number of landing gear configurations.

Figure 1B:
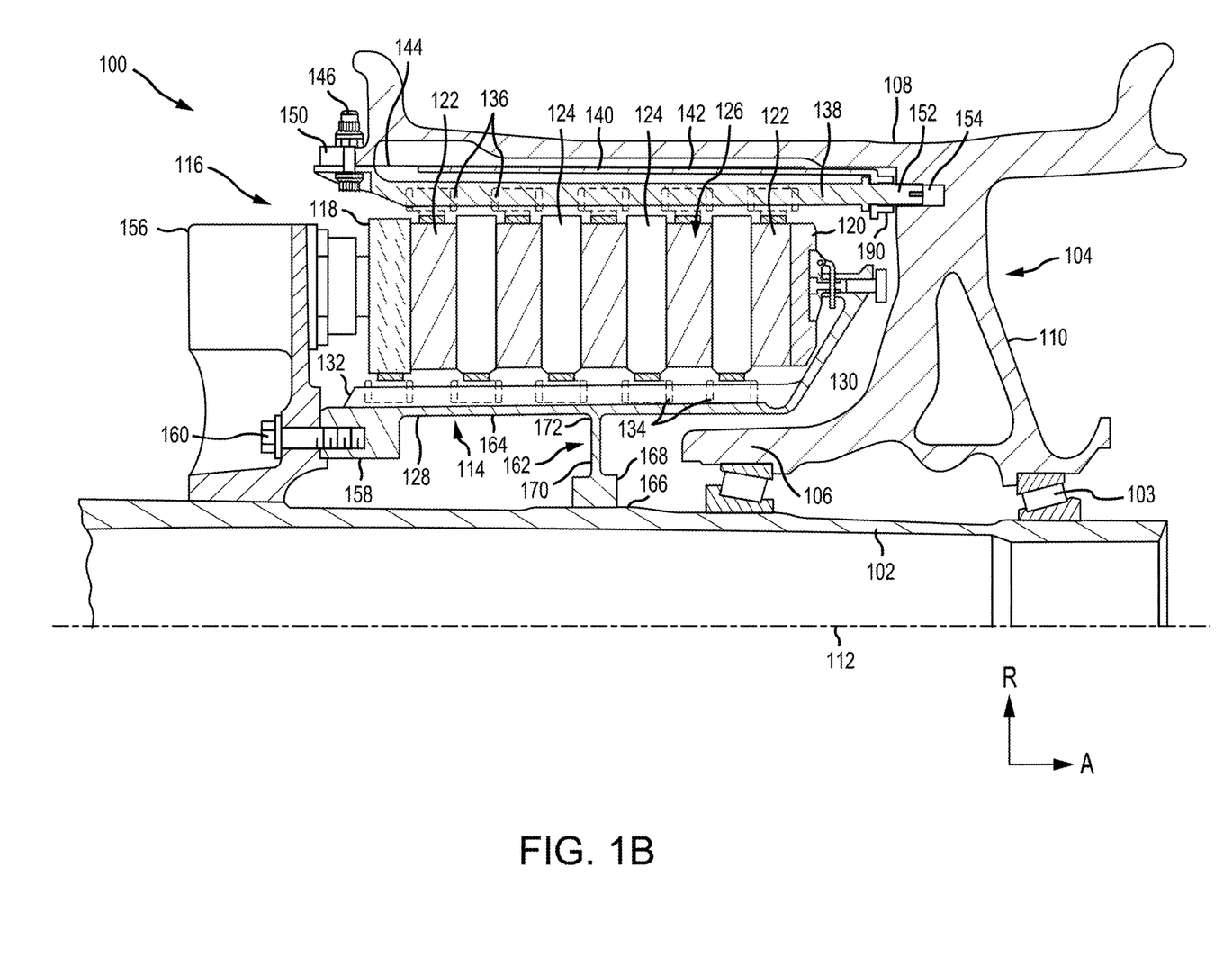
FIG. 1B illustrates a cross-sectional view of a brake assembly, in accordance with various embodiments.

Referring now to FIG. 1B, there is schematically depicted a brake mechanism 100 that may be used by the aircraft 10 of FIG. 1A or any other appropriate aircraft. The brake mechanism 100 is mounted on an axle 102 for use with a wheel 104 disposed on and configured to rotate about the axle 102 via one or more bearing assemblies 103. The wheel 104 includes a hub 106, a wheel well 108 concentric about the hub 106 and a web portion 110 interconnecting the hub 106 and the wheel well 108. A central axis 112 extends through the axle 102 and defines a center of rotation of the wheel 104. A torque plate barrel 114 (sometimes referred to as a torque tube or barrel or a torque plate or back leg) is aligned concentrically with the hub 106, and the wheel 104 is rotatable relative to the torque plate barrel 114.

The brake mechanism 100 includes a piston assembly 116, a pressure plate 118 disposed adjacent the piston assembly 116, an end plate 120 positioned a distal location from the piston assembly 116, and a plurality of rotor disks 122 interleaved with a plurality of stator disks 124 positioned intermediate the pressure plate 118 and the end plate 120. The pressure plate 118, the plurality of rotor disks 122, the plurality of stator disks 124 and the end plate 120 together form a brake heat sink or brake stack 126. The pressure plate 118, the end plate 120 and the plurality of stator disks 124 are mounted to the torque plate barrel 114 and remain rotationally stationary relative to the axle 102.

The torque plate barrel 114 may include an annular barrel or torque tube 128 and an annular plate or back leg 130. The back leg 130 is disposed at an end distal from the piston assembly 116 and may be made monolithic with the torque tube 128, as illustrated in FIG. 1B, or may be made as a separate annular piece and suitably connected to the torque tube 128. The torque tube 128 has a plurality of circumferentially spaced and axially extending splines 132 disposed on an outer surface of the torque tube 128. The plurality of stator disks 124 and the pressure plate 118 include notches or stator slots 134 on an inner periphery of the disks and the plate for engagement with the splines 132, such that each disk and the plate are axially slidable with respect to the torque tube 128.

The end plate 120 is suitably connected to the back leg 130 of the torque plate barrel 114 and is held non-rotatable, together with the plurality of stator disks 124 and the pressure plate 118, during a braking action. The plurality of rotor disks 122, interleaved between the pressure plate 118, the end plate 120 and the plurality of stator disks 124, each have a plurality of circumferentially spaced notches or rotor lugs 136 along an outer periphery of each disk for engagement with a plurality of torque bars 138 that is secured to or made monolithic with an inner periphery of the wheel 104.

An actuating mechanism for the brake mechanism 100 includes a plurality of piston assemblies, including the piston assembly 116, circumferentially spaced around an annular piston housing 156 (only one piston assembly is illustrated in FIG. 1B). Upon actuation, the plurality of piston assemblies affects a braking action by urging the pressure plate 118 and the plurality of stator disks 124 into frictional engagement with the plurality of rotor disks 122 and against the end plate 120. Fluid or hydraulic pressure, mechanical springs or electric actuators, among other mechanisms, may be used to actuate the plurality of piston assemblies. Through compression of the plurality of rotor disks 122 and the plurality of stator disks 124 between the pressure plate 118 and the end plate 120, the resulting frictional contact slows or stops or otherwise prevents rotation of the wheel 104. The plurality of rotor disks 122 and the plurality of stator disks 124 are fabricated from various materials, such as carbon matrix composites, that enable the brake disks to withstand and dissipate the heat generated during and following a braking action.

The torque plate barrel 114 is secured to a stationary portion of the landing gear such as the axle 102, preventing the torque plate barrel 114 and the plurality of stator disks 124 from rotating during braking of the aircraft. The torque tube 128 portion of the torque plate barrel 114 may be attached to the annular piston housing 156 via an annular mounting surface 158, wherein bolt fasteners 160 secure the torque plate barrel 114 to the annular piston housing 156. A spacer member or pedestal 162 is positioned between an inner diameter surface 164 of the torque tube 128 and an outer diameter surface 166 of the axle 102. The pedestal 162 includes a radially inner surface or foot 168 for engaging the axle 102, a web portion 170 radially outward of the foot 168 and a head portion 172 for engaging the inner diameter surface 164 of the torque tube 128. The pedestal 162 augments support of the torque plate barrel 114 within the brake mechanism 100 generally and, more particularly, against the axle 102. The pedestal 162 may be made monolithic with the torque tube 128 portion of the torque plate barrel 114.

A heat shield 140 is secured directly or indirectly to the wheel 104 between a radially inward surface of the wheel well 108 and the plurality of torque bars 138. As illustrated in FIG. 1B, the heat shield 140 is concentric with the wheel well 108 and may have a plurality of heat shield sections 142 disposed between respective, adjacent pairs of the plurality of torque bars 138. The heat shield 140, or heat shield sections 142, is spaced from the radially inward surface of the wheel well 108 and secured in place by heat shield tabs 190, such that the heat shield 140, or heat shield sections 142, is disposed generally parallel to the axis of rotation or central axis 112 of the wheel 104 and intermediate the plurality of torque bars 138 and the radially inward surface of the wheel well 108. In various embodiments, including for heavy-duty applications, the heat shield 140, or heat shield sections 142, may be further secured in place by heat shield carriers 144.

The plurality of torque bars 138 is attached at axially inboard ends to the wheel 104 by torque bar bolts 146. The torque bar bolts 146 extend through respective holes in a flange 150 provided on the wheel 104 as shown, which flange 150 for purposes of the present description is intended to be considered as part of the wheel well 108. Each of the plurality of torque bars 138 may include a pin 152 or similar member at its axially outboard end (i.e., the end opposite the torque bar bolts 146) that is received within a hole 154 disposed proximate the web portion 110 of the wheel 104. The heat shield 140, or heat shield sections 142, is positioned adjacent a radially inward surface of the wheel well 108 and secured in place by the heat shield tabs 190.

Each brake assembly, including the torque plate barrel 114, is designed for a specific application and modes of operation. The size (e.g., length, diameter, thickness, etc.) and material of the torque plate barrel 114 may be modified to suit a particular application or improve a mode of operation. Different modes of operation that are considered include whirl, squeal, and disc squeal, just to name a few. Additional design considerations include dynamic stability, such as torsional compliance, axial compliance, and structural asymmetry, and cooling of the brake assembly, including the torque plate barrel 114.

Figure 2A:
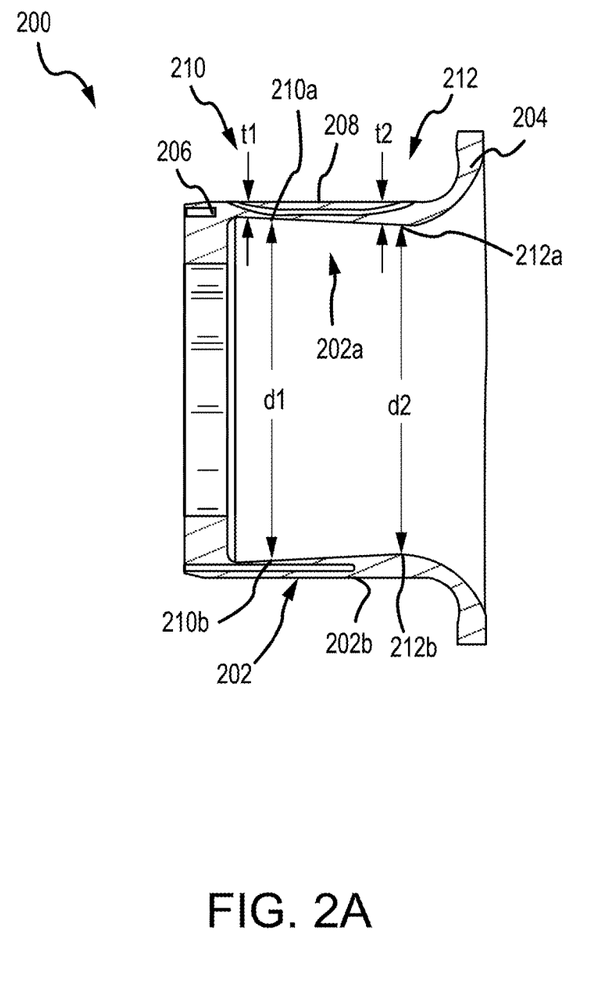
FIGS. 2A and 2B illustrate a cross-sectional view of a torque plate and barrel, in accordance with various embodiments.

Referring now to FIG. 2A, in accordance with various embodiments, a cross section of a torque plate barrel 200 is illustrated. Torque plate barrel 200 may be an example of torque plate barrel 114 described above with respect to FIG. 1B. Torque plate barrel 200 includes a barrel body 202, a back leg 204, a piston housing mating area 206, and one or more splines 208. Piston housing mating area 206 is disposed at a first end of barrel body 202 and back leg 204 is disposed at a second opposing end of barrel body 202. Barrel body 202 further includes a first portion 210 adjacent the piston housing mating area 206 at the first end and a second portion 212 adjacent the back leg 204 at the second end. Barrel body 202 has a generally cylindrical shape having an inner surface 202a extending around an inner circumference of barrel body 202 and an outer surface 202b extending around an outer circumference of barrel body 202.

Barrel body 202, and more specifically, inner surface 202a has a taper along the inner circumference of barrel body 202 such that first portion 210 has a first thickness t1 and second portion 212 has a second thickness t2. Thickness t1 is less than thickness t2. In various embodiments, thickness t1 may be about 20% to about 70% of thickness t2, and more specifically, about 30% to about 50% of thickness t2. The outer surface 202b, and more specifically, the outer circumference, or diameter, of barrel body 202 is uniform.

First portion 210 extends around the circumference of barrel body 202 such that a first point 210a on inner surface 202a of first portion 210 is opposite a second point 210b on inner surface 202a of first portion 210, as illustrated in FIG. 2A. There is a distance d1 between first point 210a and second point 210b. That is, distance d1 is measured between first point 210a on inner surface 202a and second point 210b on inner surface 202a. Second portion 212 extends around the circumference of barrel body 202 such that a first point 212a on inner surface 202a of second portion 212 is opposite a second point 212b on inner surface 202 of second portion 212, as illustrated in FIG. 2A. There is a distance d2 between first point 212a and second point 212b. That is, distance d2 is measured between first point 212a on inner surface 202a and second point 212b on inner surface 202a. Distance d2 is less than distance d1 due to thickness t2 being greater than thickness t1. In various embodiments, distance d2 is about 1% to about 10% less than distance d1, and more specifically, about 3% to about 7% less. The outer circumference of barrel body 202 at points 210a, 210b is about the same (e.g., +/−1%) as the outer circumference of barrel body 202 at points 212a, 212b.

In various embodiments, the taper of inner surface 202a may increase uniformly between first point 210a and first point 212a. In various embodiments, the taper of inner surface 202a may be larger or smaller than illustrated. That is, the difference between thickness t1 and thickness t2 may be larger or smaller than illustrated. In various embodiments, the taper may be continuous. In various embodiments, the taper may be stepped.

Figure 2B:
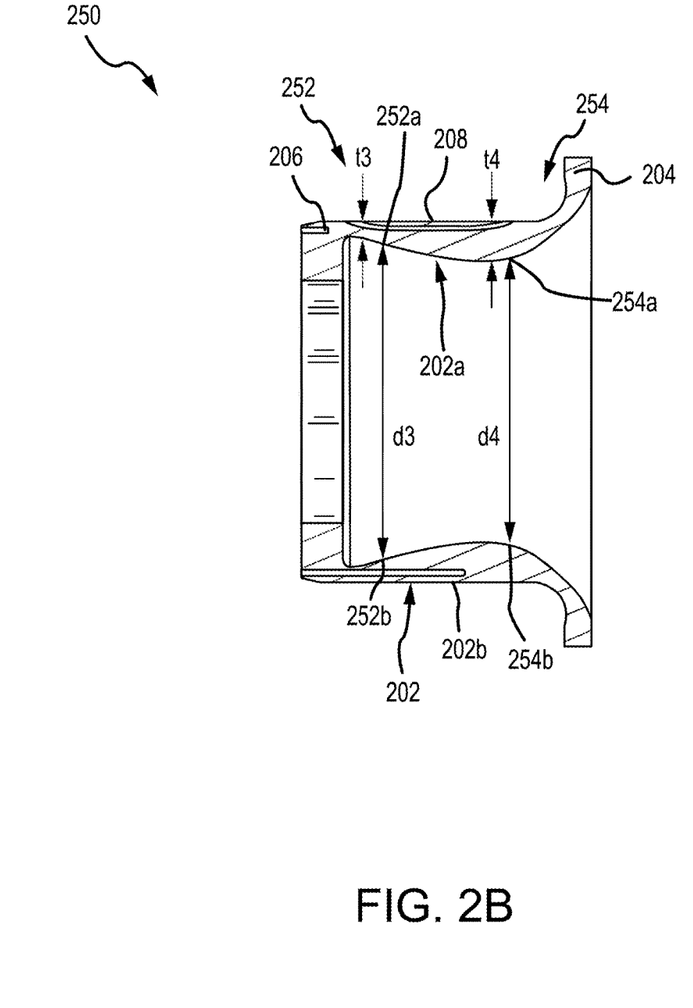

Referring now to FIG. 2B, accordance with various embodiments, a cross section of a torque plate barrel 250 is illustrated. Torque plate barrel 250 may be an example of torque plate barrel 114 described above with respect to FIG. 1B. Torque plate barrel 250 includes similar components to those described above with respect to torque plate barrel 200 shown in FIG. 2A, including a barrel body 202, a back leg 204, a piston housing mating area 206, and one or more splines 208. Therefore, for simplicity, descriptions of similar components may not be repeated in the description of torque plate barrel 250.

Torque plate barrel 250 further includes a first portion 252 adjacent the piston housing mating area 206 at the first end and a second portion 254 adjacent the back leg 204 at the second end. Barrel body 202 has a cylindrical shape having an inner surface 202a extending around an inner circumference of barrel body 202. Barrel body 202, and more specifically, inner surface 202a has a taper along the inner circumference of barrel body 202 such that first portion 252 has a third thickness t3 and second portion 254 has a fourth thickness t4. Thickness t3 is less than thickness t4. In various embodiments, thickness t3 may be about 20% to about 70% of thickness t4, and more specifically, about 30% to about 50% of thickness t4.

First portion 252 extends around the circumference of barrel body 202 such that a first point 252a on inner surface 202a of first portion 252 is opposite a second point 252b on inner surface 202a of first portion 252, as illustrated in FIG. 2B. There is a distance d3 between first point 252a and second point 252b. That is, distance d3 is measured between first point 252a on inner surface 202a and second point 252b on inner surface 202a. Second portion 254 extends around the circumference of barrel body 202 such that a first point 254a on inner surface 202a of second portion 254 is opposite a second point 254b on inner surface 202a of second portion 254, as illustrated in FIG. 2B. There is a distance d4 between first point 254a and second point 254b. That is, distance d4 is measured between first point 254a on inner surface 202a and second point 254b on inner surface 202a. Distance d4 is less than distance d3 due to thickness t4 being greater than thickness t3. In various embodiments, distance d4 is about 1% to about 10% less than distance d3, and more specifically, about 3% to about 7% less. In various embodiments, the taper of the inner circumference may increase gradually until the taper reaches maximum thickness and then sharply decreases where barrel body 202 connects to back leg 204. For example, the taper may increase gradually between points 252a, 252b and points 254a, 254b where it has a maximum thickness identified by distance d4, and the taper then sharply decreases until barrel body 202 connects with back leg 204.

In various embodiments, the taper of inner surface 202a described herein does not change the weight and/or the composition of the torque plate barrel 200, 250, as compared to a torque plate barrel without a taper, while providing an improvement to dynamic stability of the torque plate barrel 200, 250. In various embodiments, the taper of inner surface 202a described herein causes a negligible weight change (i.e., +/−5% of total weight) to torque plate barrel 200, 250, as compared to a torque plate barrel without a taper, while providing an improvement to dynamic stability of the torque plate barrel 200, 250.

Figure 3A:
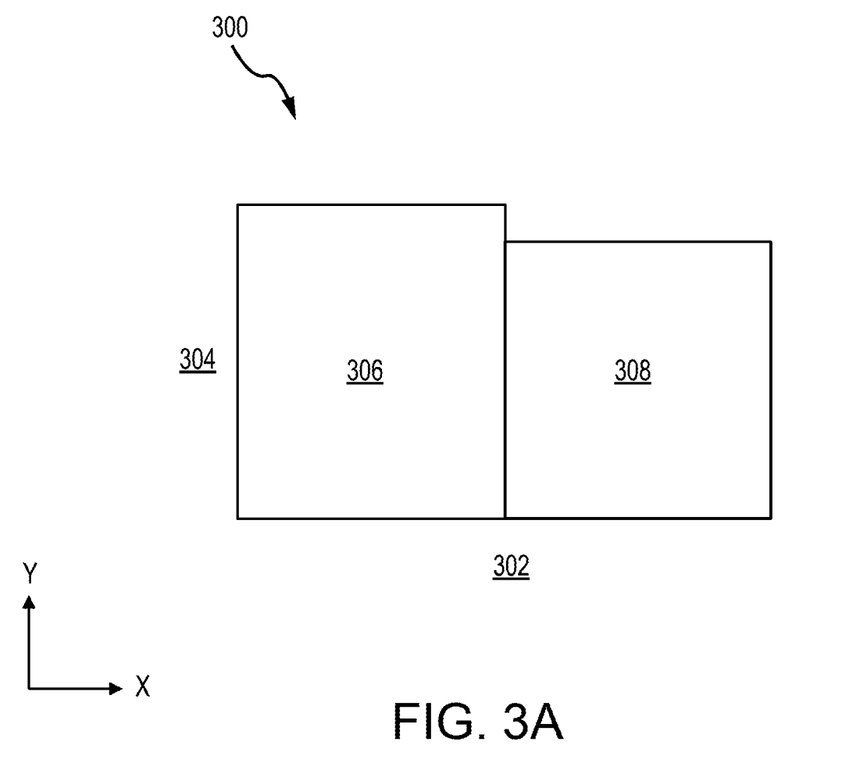
FIGS. 3A and 3B illustrate graphical representations of a whirl mode and a squeal mode vibrational response, in accordance with various embodiments.
Figure 3B:
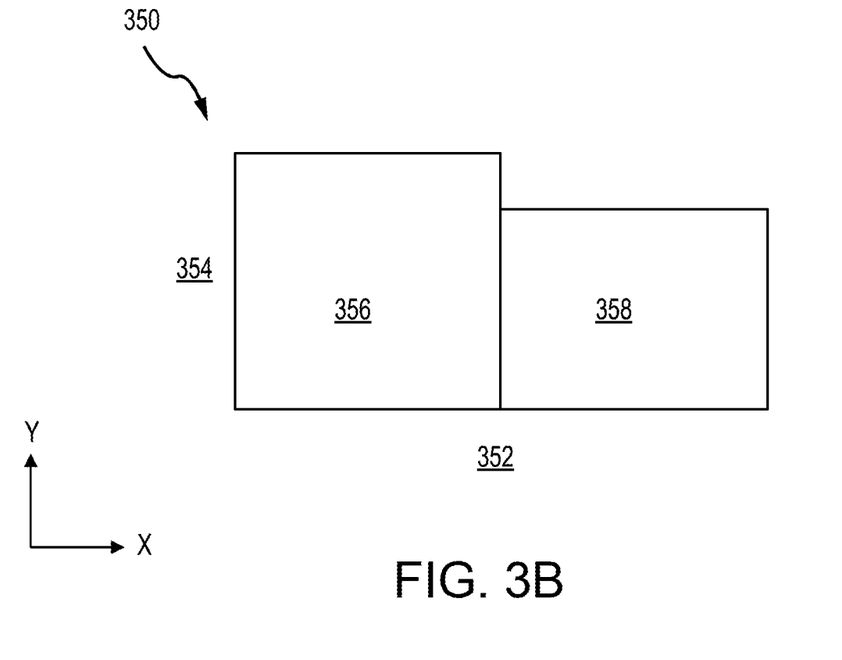

Referring now to FIGS. 3A and 3B, in accordance with various embodiments, a bar graph 300 and a bar graph 350 are illustrated. Bar graph 300 illustrates the influence of a tapered torque plate barrel, according to various embodiments described herein, on the dynamic stability of a brake assembly (e.g., brake mechanism 100), specifically with respect to whirl mode vibration over a frequency range (e.g., about 125 Hz to about 250 Hz). Bar graph 300 indicates a frequency range 302 (e.g., about 125 Hz to about 250 Hz) along an x-axis and a whirl propensity 304 of the brake assembly along a y-axis. Bar graph 300 further includes a baseline response 306 and a tapered torque barrel response 308. Baseline response 306 (i.e., a brake assembly using torque plate barrel without a taper) illustrates a first amount of whirl propensity 304 at the given frequency range 302. Torque barrel response 308 (i.e., torque barrel 202 as disclosed herein) illustrates a second amount of whirl propensity 304 at the given frequency range 302. As illustrated in bar graph 300, there is a reduction in whirl propensity 304 in a brake assembly using a tapered torque plate barrel (i.e., response 308) as opposed to a brake assembly using a non-tapered torque plate barrel (i.e., response 306). In various embodiments, the reduction in whirl propensity 306 of the tapered torque barrel may be about 8% to about 12% as compared to the baseline torque barrel.

Bar graph 350 illustrates the influence of a tapered torque plate barrel, according to various embodiments described herein, on the dynamic stability of a brake assembly (e.g., brake mechanism 100), specifically with respect to squeal mode vibrations over a frequency range (e.g., about 250 Hz to about 350 Hz). Bar graph 350 indicates a frequency range 352 (e.g., about 250 Hz to about 350 Hz) along an x-axis and a squeal vibration propensity 354 of the brake assembly along a y-axis. Bar graph 350 further includes a baseline response 356 and a tapered torque barrel body response 358. Baseline response 356 (i.e., a brake assembly using a torque plate barrel without a taper) illustrates a first amount of squeal propensity 354 at the given frequency range 352. Torque barrel response 358 (e.g., torque barrel 202 as disclosed herein) illustrates a second amount of squeal propensity 354 at the given frequency range 352. As illustrated in bar graph 350, there is a reduction in squeal propensity 354 in a brake assembly using a tapered torque plate barrel (i.e., response 358) as opposed to a brake assembly using a non-tapered torque plate barrel (i.e., response 356). In various embodiments, the reduction in squeal propensity 356 of the tapered torque barrel may be about 15% to about 20% as compared to the baseline torque barrel.

Figure 4:
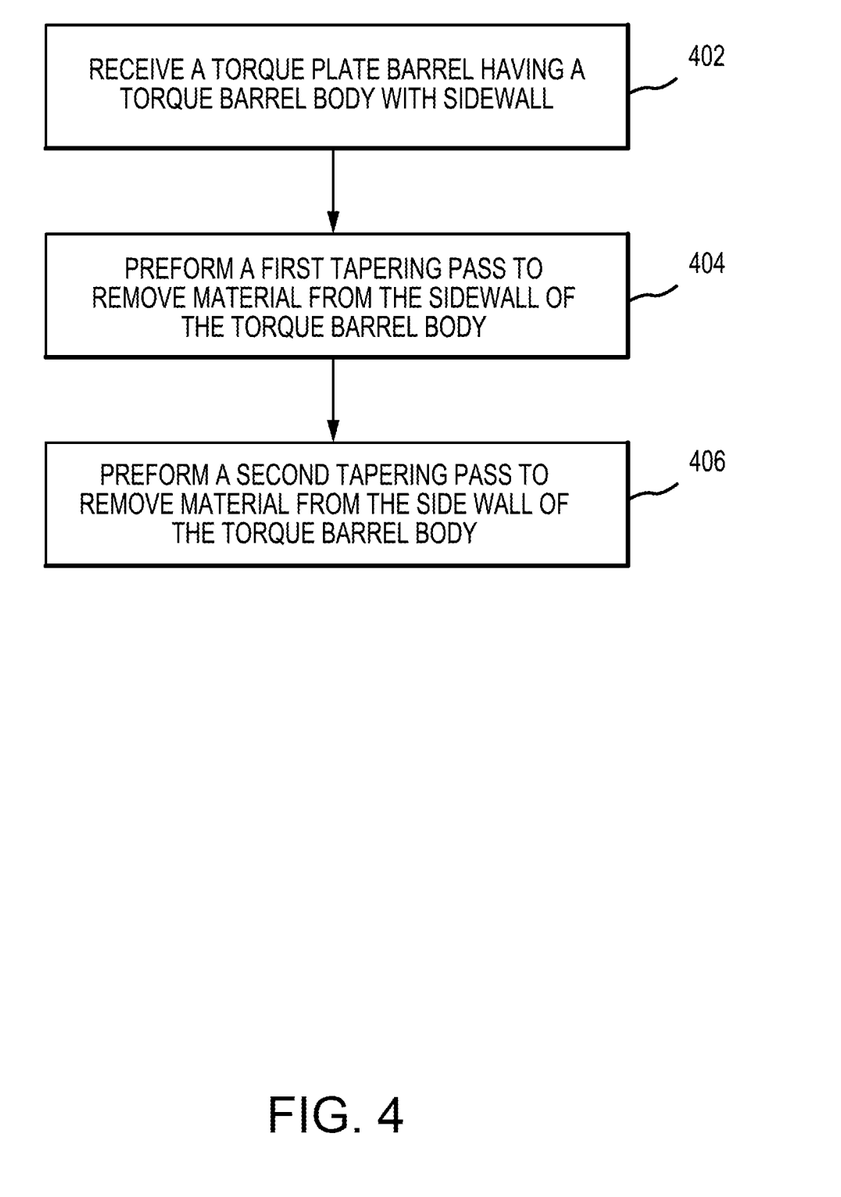
FIG. 4 illustrates a flow diagram of a method of forming a torque plate and barrel, in accordance with various embodiments.

Referring now to FIG. 4, in accordance with various embodiments, a flow diagram of a method 400 for forming a torque plate barrel is illustrated. At block 402, a torque plate barrel is received (e.g., torque plate barrel 200). The torque plate barrel has a torque barrel body (e.g., barrel body 202) having a first end and an opposing second end. The torque barrel body has sidewalls and an inner surface. The sidewalls have an initial thickness. At block 404, a first tapering process is performed to remove material from the inner surface sidewalls of the torque barrel body. In various embodiments, the tapering process may be a subtractive and/or a milling process. In various embodiments, the tapering process may be a casting and/or a forging process. More material is removed from the first end of the torque barrel body than from the second end. In various embodiments, no material is removed from the second end of the torque barrel body. In various embodiments, the tapering process may be an additive process. In various embodiments, more material may be added to the second end of the torque barrel than the first end of the torque barrel. In various embodiments, no material is added to the second end of the torque barrel body. At block 406, an optional second tapering process may be performed to remove more material from the inner surface sidewalls of the torque barrel body to form a tapered inner surface of the torque barrel body. In various embodiments, the second tapering process may be the same process as the first tapering process. In various embodiments, the second tapering process may be a different process than the first tapering process. This process is repeated until a desired taper is formed where the first end of the torque barrel body has a first thickness, and the second end of the torque barrel body has a second thickness. The second thickness being larger than the first thickness.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatuses are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A torque plate barrel for use with a brake system, comprising:
    a barrel body having an outer diameter, an inner diameter, and an axial length extending from a first end to an opposing second end, wherein:
        the inner diameter varies along the axial length and the outer diameter is fixed along the axial length,
        the varying inner diameter forms a taper that extends axially along an inner surface of the barrel body such that the inner diameter decreases from a first portion first point to a second portion first point and increases from the second portion first point to a back leg disposed at the second end of the barrel body,
        the barrel body has a first thickness at the first end and a second thickness at the second end,
        a first distance is defined as being between the first portion first point on the inner surface at the first thickness and a diametrically opposing first portion second point on the inner surface at the first thickness, and
        a second distance is less than the first distance and is defined as being between the second portion first point on the inner surface at the second thickness and a diametrically opposing second portion second point on the inner surface at the second thickness.

2. The torque plate barrel of claim 1, wherein the first thickness is less than the second thickness.

3. The torque plate barrel of claim 1, wherein the first thickness is about 20% to about 70% of the second thickness.

4. The torque plate barrel of claim 1, where in the second distance is about 1% to about 10% less than the first distance.

5. The torque plate barrel of claim 1, wherein the second distance is about 3% to about 7% less than the first distance.

6. A brake assembly attached to a wheel, comprising:
    a torque barrel having an inner diameter and an axial length, the axial length having a first end and an opposing second end, the inner diameter decreasing along the axial length from the first end to the second end, wherein:
        the torque barrel has a first thickness at the first end and a second thickness at the second end,
        the varying inner diameter forms a taper that extends axially along the inner surface of the torque barrel such that the inner diameter decreases from a first portion first point to a second portion first point and increases from the second portion first point to a back leg disposed at the second end of the torque barrel,
        a first distance is defined as being between the first portion first point on the inner surface at the first thickness and a diametrically opposing first portion second point on the inner surface at the first thickness, and
        a second distance is less than the first distance and is defined as being between the second portion first point on the inner surface at the second thickness and a diametrically opposing second portion second point on the inner surface at the second thickness;

a heat sink disposed around the torque barrel; and a plurality of stator disks mounted to the torque barrel.

7. The brake assembly of claim 6, wherein the first thickness is about 20% to about 70% of the second thickness.

8. The brake assembly of claim 6, wherein the torque barrel further comprises:

a barrel body, and wherein the back leg is connected to the barrel body adjacent the second end.

9. The brake assembly of claim 6, wherein the torque barrel further comprises:

an outer surface extending along the axial length, wherein the outer surface is uniform along the axial length.

10. The brake assembly of claim 6, wherein the first thickness is less than the second thickness.

11. The brake assembly of claim 6, wherein the second diameter is about 1% to about 10% less than the first diameter.

12. A method of forming a torque plate barrel, comprising:

receiving a torque plate barrel having a first end and an opposing second end, the torque plate barrel having an inner surface sidewall extending from the first end to the second end; and performing a tapering process to remove material from the inner surface sidewall, the tapering processing removing more material from the inner surface sidewall at the first end of the torque plate barrel than from the second end of the torque plate barrel, such that the tapering process forms a varying inner diameter, wherein;

the varying inner diameter forms a taper that extends axially along the inner surface of the torque plate barrel such that the inner diameter decreases from a first portion first point to a second portion first point and increases from the second portion first point to a back leg disposed at the second end of the torque plate barrel, the torque plate barrel has a first thickness at the first end and a second thickness at the second end, a first distance is defined as being between the first portion first point on the inner surface at the first thickness and a diametrically opposing first portion second point on the inner surface at the first thickness, and a second distance is less than the first distance and is defined as being between the second portion first point on the inner surface at the second thickness and a diametrically opposing second portion second point on the inner surface at the second thickness.

13. The method of claim 12, further comprising:

a second tapering process, wherein the second tapering process creates a uniform change in thickness of the inner surface sidewall from the first end to the second end.

* * * * *